United States Patent [19]
Planeta

[11] Patent Number: 5,395,665
[45] Date of Patent: Mar. 7, 1995

[54] WOVEN PLASTIC MATERIAL

[76] Inventor: Mirek Planeta, 170 Traders Blvd., Mississauga, Ont. L4Z 1WZ, Canada

[21] Appl. No.: 289,035

[22] Filed: Aug. 11, 1994

[51] Int. Cl.⁶ ............................................. B29D 22/00
[52] U.S. Cl. ................... 428/36.1; 139/389; 428/36.3; 428/193; 428/225; 428/229
[58] Field of Search .............. 428/193, 225, 229, 35.2, 428/36.1, 36.3; 139/389

[56] References Cited

U.S. PATENT DOCUMENTS

| | | | |
|---|---|---|---|
| 4,761,913 | 8/1988 | Henningsson et al. | 428/229 |
| 4,906,520 | 3/1990 | Humar | 428/225 |
| 5,304,414 | 4/1994 | Bainbridge et al. | 428/229 |

Primary Examiner—James J. Bell
Attorney, Agent, or Firm—Rogers & Scott

[57] ABSTRACT

Woven plastic material is formed from woven strips of laminated multi-layer plastic film. Each strip has an inner layer of synthetic plastic material with a first melting temperature and two outer layers of synthetic plastic material on opposite sides of and bonded to the inner layer, the outer layers being of a synthetic plastic material with a second melting temperature lower than the first melting temperature. The woven strips comprise longitudinally-extending strips and transversely-extending strips interwoven therewith, and the outer layers of crossing longitudinally-extending strips and transversely-extending strips are bonded together at crossing locations.

11 Claims, 3 Drawing Sheets

WOVEN PLASTIC MATERIAL

This invention relates to woven synthetic plastic material. Such woven plastic material may be produced as a tubular sleeve from which bags may be made or may be produced in sheet form for various other uses.

It is known to produce a tubular sleeve of woven strips of synthetic plastic material which is then cut into sleeve lengths which are sealed at one end to form bags. The bags are subsequently filled with a product and the other ends sealed to close the bags for transportation and sale. Known bags of this kind have the problem that the open end tends to unravel prior to closure with result that satisfactory closure becomes difficult. Similar problems arise if the material is in sheet form. Also, it is often desirable for such bags to have some degree of porosity, i.e. communication between the interior of the bag and the external atmosphere, to prevent deterioration of the contents of the bag. Attempts have been made to eliminate the unravelling problem by extrusion coating the woven material, but this eliminates porosity.

It is therefore an object of the invention to provide woven plastic material in which the likelihood of unravelling at an end is substantially reduced and which may if desired posses suitable porosity.

According to the present invention, woven plastic material comprises woven strips of plastic film having a first melting temperature, the strips comprising longitudinally-extending strips and transversely-extending strips interwoven therewith. At least some of the strips carry a layer of bonding material on at least one surface thereof, the bonding material having a second melting temperature lower than the first melting temperature. The longitudinally-extending strips and transversely-extending strips are bonded together by the bonding material at crossing locations where at least one strip has a bonding there adjacent to the other strip.

Such woven plastic material has high resistance to unravelling comparable to unbonded material and may be produced with desired porosity. Also, the bonding increases the strength of the material.

At least some of the strips may carry a bonding layer on both sides thereof, and the layer of bonding material may comprise synthetic plastic material.

Each strip is preferably molecularly oriented substantially in the direction of the length of the strip. Each strip may be a synthetic plastic material selected from the group consisting of polypropylene, polyethylene, linear low density polyethylene, polyamides, high density polyethylene, polyesters, polystyrene, polyvinyl chloride, their copolymers and mixtures thereof.

The width of each strip may in the range of from about 0.0005 to about 2 inches, and the thickness of each strip may be in the range of from about 0.0001 to about 0.005 inches.

The layers of bonding material may comprise synthetic plastic material selected from the group consisting of linear low density polyethylene, ionomers (for example surlyn), polyvinyl chloride, ethyl vinyl acetate, ethyl propyl copolymers, polyethylene copolymers, low density polyethylene, their copolymers, vinyl copolymers and mixtures thereof. The bonding material may contain one of more additives to improve welding and adhesion.

The thickness of each bonding layer may be in the range of from about 0.00005 to about 0.002 inches.

The woven plastic material may be produced in sheet form or as a tubular sleeve. Bags may be formed from cut lengths of such a tubular sleeve closed at at least one end.

Embodiments of the invention will now be described, by way of example, with reference to the accompanying drawings, of which:

Figure 1:
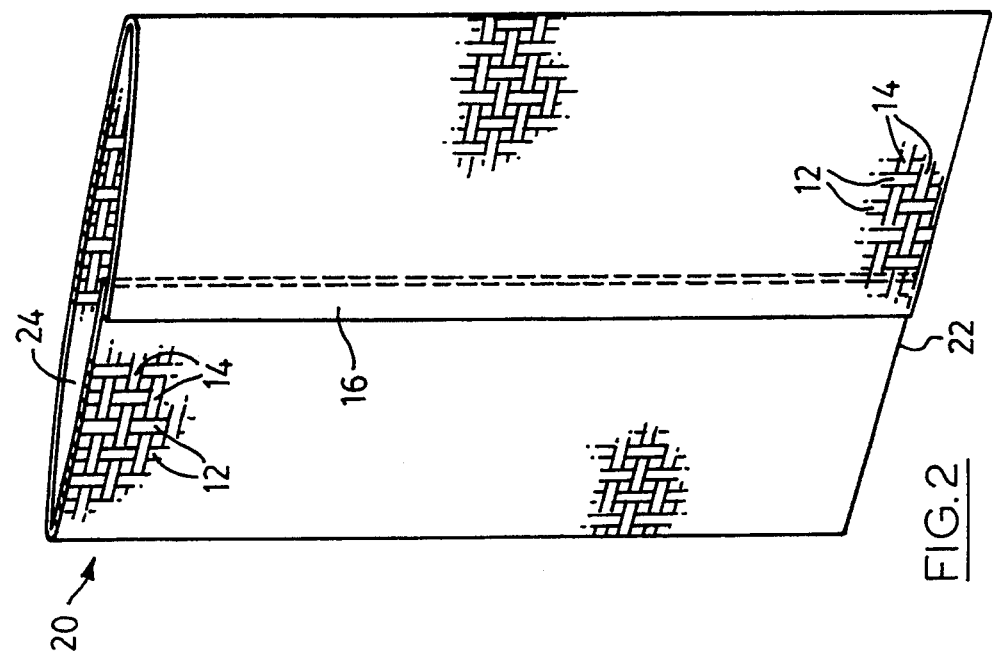
FIG. 1 is a perspective view of a tubular sleeve in accordance with one embodiment of the invention.
Figure 2:
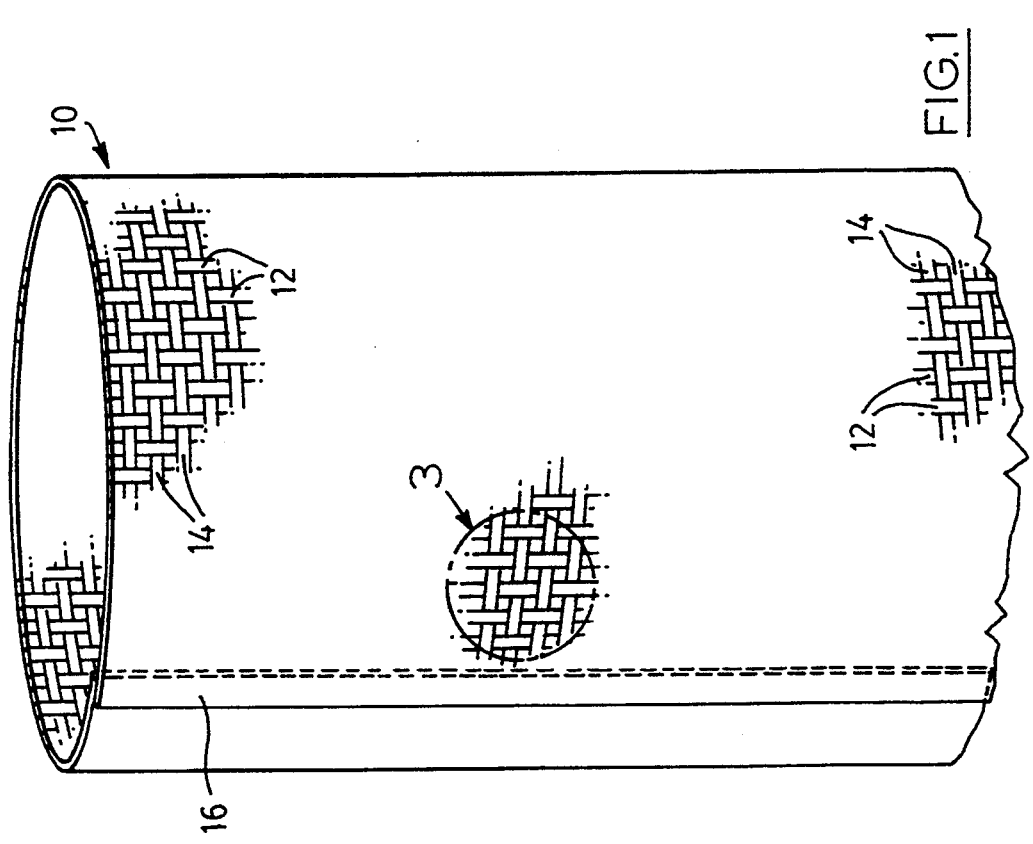
FIG. 2 is a perspective view of a bag formed from the tubular sleeve of FIG. 1.
Figure 3:
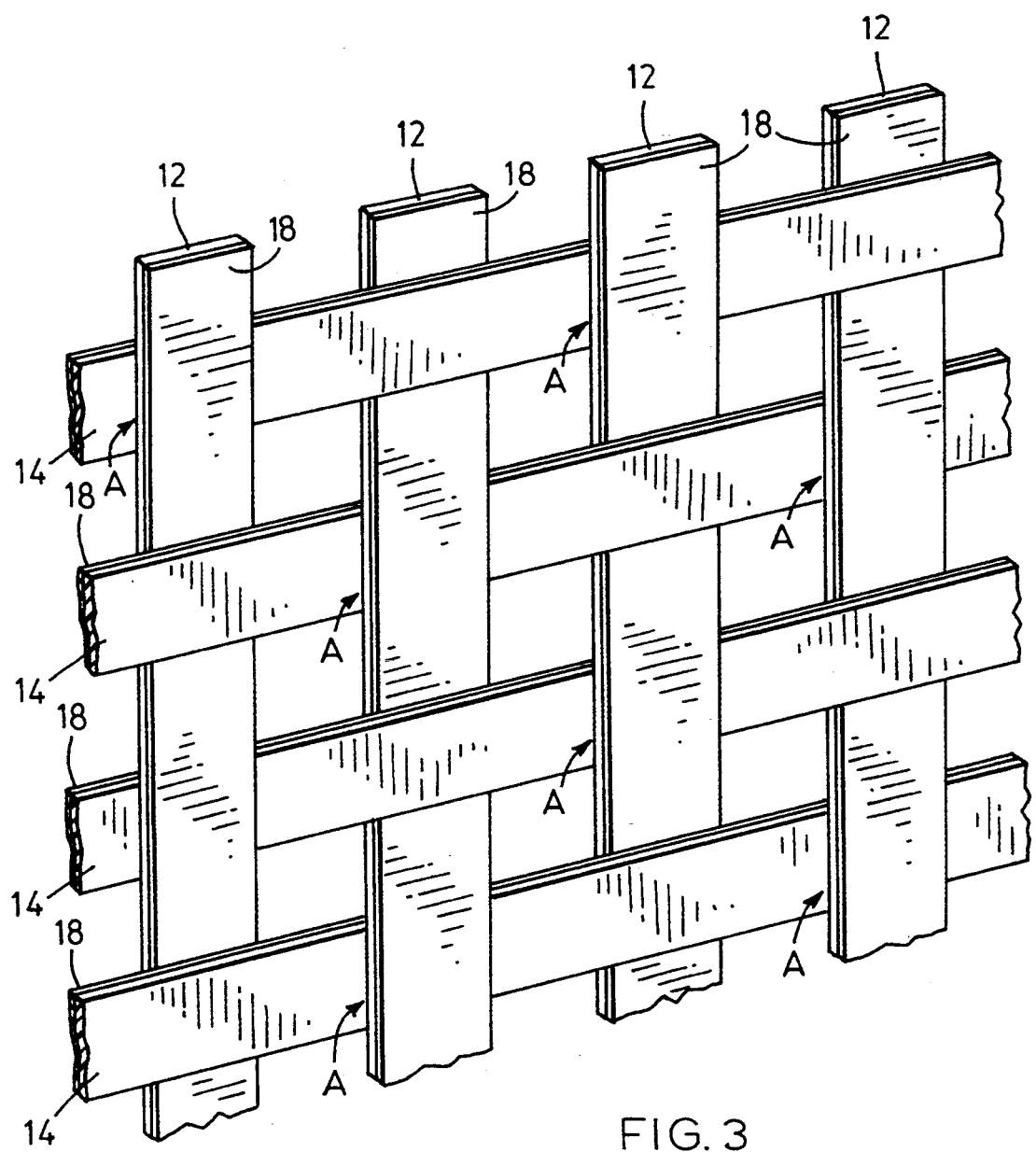
FIG. 3 is an enlarged detail view of the circled area 3 of FIG. 1.

Referring first to FIGS. 1 to 3 of the drawings, a tubular sleeve 10 is first woven in sheet form with strips of laminated multi-layer plastic film, the woven strips comprising longitudinally-extending strips 12 and transversely-extending strips 14 interwoven therewith. The sheet is then wrapped around a mandrel and overlapping edges seamed along their length to provide a longitudinal seam 16.

Each strip 12, 14 is of high density polyethylene with a width in the range of from about 0.005 to about 2 inches and a thickness in the range of from about 0.0001 to about 0.005 inches and a melting temperature of about 130° C. Each strip 12, 14 carries a bonding layer 18 of ethyl acetate on one side thereof with a thickness in the range of from about 0.0001 to about 0.005 inches and a melting temperature of about 90° to 100° C. The bonding layer 18 is bonded to the strip 12 of 14.

The strips 12, 14 are preferably molecularly oriented in the direction of its length for increased strength. The strips 12, 14 and bonding layers 18 can be formed by co-extruding the strips 12, 14 and the bonding layers 18 and then bonding the bonding layers 18 to the strip 12 or 14 at a temperature which is high enough to soften the bonding layers 18 but not sufficiently high to cause strip 16 to lose its molecular orientation. The strips 12, 14 can be molecularly oriented in the direction of their length either before or after application of the bonding layer 18.

The strips 12, 14 are interwoven in known manner in sheet form, which is then passed through a heated area to raise the temperature of the sleeve 10 to a value sufficient to soften the bonding layers 18 but not sufficient to soften the strips 14, 16 to an extent to cause the molecular orientation of the inner strips 14, 16 to be adversely affected. Such softening of the bonding layers 18 causes the bonding layer 18 of the end strip 12, 14 to become bonded to the bonding layer 18 of a strip 12, 14 or directly to the strip 12, 14 at locations where they cross.

At the crossing locations indicated by the arrows A in FIG. 3, no bonding or crossing strips 12, 14 occurs because neither of the bonding layers 18 is in contact with the adjacent strip 12, 14 or bonding layer 18 thereof. These unbonded locations A therefore provide the material with a degree of porosity, the amount of which is determined by the spacing of the strips 12, 14 (which is exaggerated in FIG. 3 for clarification).

To form the bag 20 shown, in FIG. 2, the sheet is wrapped around a mandrel and seamed in a conventional manner to provide a longitudinal seam 16 and form the tubular sleeve 10. An appropriate length is cut from the tubular sleeve 10 and one end 22 is closed by conventional method, the bag 20 consequently having an open end 24.

Bonding of the transverse strips 14 to the longitudinal strips 12 prevents the open end from unravelling, that is to say the transverse strips 14 at the open end 24 will not slide off and become detached from the longitudinal strips 12. The bag can then be filled with product and the open end 24 closed in any desired manner.

The porosity is useful where the product to be contained within the bag 20 needs contact with the outside air. Such products may for example be cement or food such as potatoes or vegetables. Also, the material may be selected so that the bag has a desirable amount of elasticity, which is useful where capability of energy absorbtion is required, for example to resist likelihood of breakage.

If desired, the woven plastic material can be used in sheet form, for example as a tarpaulin or as wrapping material for lumber. The woven plastic material may also be provided as woven breathable material with adjustable porosity.

It will also be readily appreciated that a particular advantage of woven plastic material in accordance with the present invention is that the bonding of bondable crossing locations can be effected by conventional bonding equipment, for example heat sealing, ultrasonic sealing, dielectric sealing or magnetic sealing.

Figure 4:
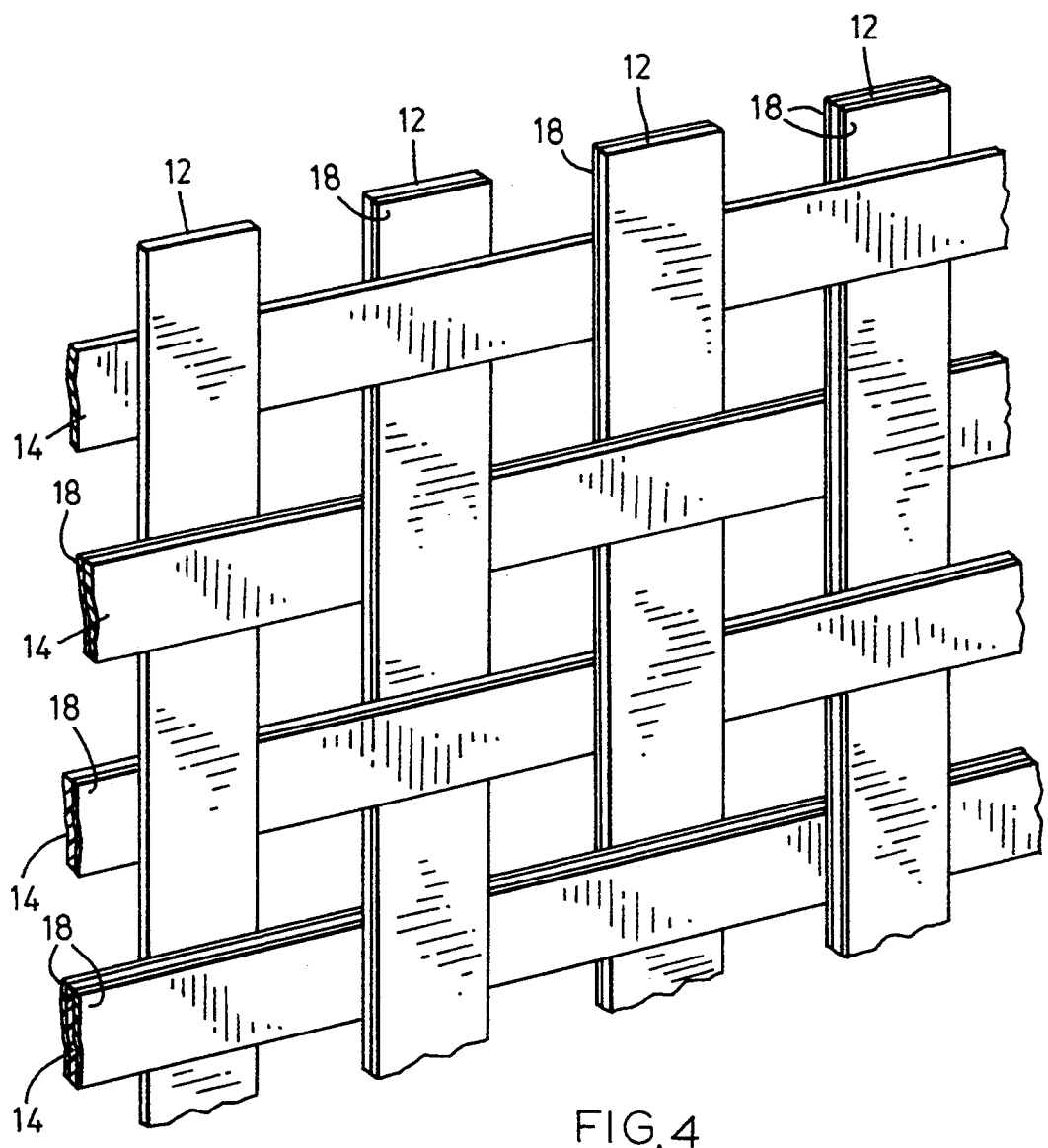
FIG. 4 is a view similar to FIG. 3 but showing other possible embodiments of the invention.

FIG. 4 shows possible variations of the embodiment shown in FIG. 3. As shown, some longitudinal strips 12 may have no bonding layers 18, some may have a bonding layer 18 on one side thereof, and some may have bonding layers 18 on both sides thereof. Similar comments apply to the transverse strips 14. A person skilled in the art can readily select combinations of such strips 12, 14 to produce woven plastic material with desired porosity properties.

Other embodiments of the invention will also be readily apparent to a person skilled in the art, the scope of the invention being defined in the appended claims.

I claim:

1. Woven plastic material comprising:
   woven strips of plastic film, having a first melting temperature, said strips comprising longitudinally-extending strips and transversely-extending strips interwoven therewith,
   at least some of the strips comprising a layer of bonding material on at least one surface thereof, said bonding material having a second melting temperature lower than the first melting temperature, and
   said longitudinally-extending strips-and transversely-extending strips being bonded together by said bonding material at crossing locations where at least one strip has a bonding layer adjacent the other strip.

2. Woven plastic material according to claim 1 wherein at least some of the strips carry a bonding layer on both sides thereof.

3. Woven plastic material according to claim 1 wherein said layer of bonding material comprises synthetic plastic material.

4. Woven plastic material according to claim 1 wherein each strip is molecularly oriented substantially in the direction of the length of the strip.

5. Woven plastic material according to claim 1 wherein each strip is of a synthetic plastic material selected from the group consisting of polypropylene, polyethylene, linear low density polyethylene, polyamides, high density polyethylene, polyesters, polystyrene, polyvinyl chloride, their copolymers and mixtures thereof.

6. Woven plastic material according to claim 1 wherein the width of each strip is in the range of from 0.005 to about 2 inches.

7. Woven plastic material according to claim 1 wherein the thickness of each strip is in the range of from about 0.0001 to about 0.005 inches.

8. Woven plastic material according to claim 1 wherein said layer of bonding material comprises synthetic plastic material selected from the group consisting of linear low density polyethylene, ionomers, polyvinyl chloride, ethyl vinyl acetate, ethyl propyl copolymers, polyethylene copolymers, low density polyethylene, their copolymers, vinyl copolymers and mixtures thereof.

9. Woven plastic material according to claim 1 wherein the thickness of each bonding layer is in the range of from about 0.00005 to 0.002 inches.

10. A tubular sleeve of woven plastic material according to claim 1.

11. A bag comprising a length of tubular sleeve claimed in claim 10, said sleeve length being closed at at least one end.

* * * * *